(12) United States Patent
Oberman et al.

(10) Patent No.: US 7,366,745 B1
(45) Date of Patent: Apr. 29, 2008

(54) HIGH-SPEED FUNCTION APPROXIMATION

(75) Inventors: Stuart F. Oberman, Sunnyvale, CA (US); Ming Y. Siu, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 663 days.

(21) Appl. No.: 10/861,184

(22) Filed: Jun. 3, 2004

(51) Int. Cl.
*G06F 1/02* (2006.01)
(52) U.S. Cl. .................................................. 708/270
(58) Field of Classification Search ............... 708/270, 708/290
See application file for complete search history.

(56) References Cited

U.S. PATENT DOCUMENTS

| 5,068,816 | A  | * | 11/1991 | Noetzel | 708/270 |
| 7,143,127 | B2 | * | 11/2006 | Cheng | 708/290 |
| 2003/0187892 | A1 | * | 10/2003 | Cheng | 708/290 |
| 2003/0195907 | A1 | * | 10/2003 | Budge | 708/290 |
| 2007/0124357 | A1 | * | 5/2007 | Tang et al. | 708/500 |

OTHER PUBLICATIONS

J.-A. Piñeiro et al., Faithful Powering Computation Using Table Look-up and a Fused Accumulation Tree*, Proceedings of the 15th IEEE Symposium on Computer Arithmetic (ARITH'01), (2001).

Jean-Michel Muller, ""Partially rounded"Small-Order Approximations for Accurate, Hardware-Oriented, Table-Based Methods," Proceedings of the 16th IEEE Symposium on Computer Arithmetic (ARITH'03), (2003).

* cited by examiner

*Primary Examiner*—Tan V. Mai
(74) *Attorney, Agent, or Firm*—Townsend and Townsend and Crew, LLP

(57) ABSTRACT

Methods and apparatuses are presented for determining coefficients for a polynomial-based approximation of a function, by iteratively estimating a first coefficient, reducing the first coefficient to a lower precision to obtain a first limited-precision coefficient, analytically calculating a second coefficient by taking into account the first limited-precision coefficient, reducing the second coefficient to a lower precision to obtain a second limited-precision coefficient, iteratively estimating a third coefficient by taking into account at least one of the first limited-precision coefficient and the second limited-precision coefficient, and reducing the third coefficient to a lower precision to obtain a third limited-precision coefficient. In one embodiment of the invention, the polynomial-based approximation relates to a minimax approximation of the function approximated, and at least one of the steps for iteratively estimating the first coefficient and iteratively estimating the third coefficient involves use of a Remez exchange algorithm.

22 Claims, 4 Drawing Sheets

```
                                           recip_hybrid1.txt
recip_hybrid:=proc(cc,p,q)

local errmax,pol1,i,C1,C2,C0,err,a0,a1,a2,aa2;

errmax:=0;
errminimax_max:=0;
err_rounded_max:=0;
FinalC0:=array(0..127);
FinalC1:=array(0..127);
FinalC2:=array(0..127);
a0max:=0; a1max:=0; a2max:=0;
C0max:=0; C1max:=0; C2max:=0;
C0min:=10; C1min:=10; C2min:=10;

Digits:=13;
with(numapprox);

for i from 0 to 127 do
        pol1:=minimax(1/(1 + 1/128*i +x),x=0..1/128,
              [2,0],1,'err');
        a0[i]:= coeff(pol1,x,0);
        a1[i]:= coeff(pol1,x);
        a2[i]:= coeff(pol1,x^2);
        # find maxes
        if (a0max < abs(a0[i])) then
               a0max := abs(a0[i]) end if;
        if (a1max < abs(a1[i])) then
               a1max := abs(a1[i]) end if;
        if (a2max < abs(a2[i])) then
               a2max := abs(a2[i]) end if;
end do;

for i from 0 to 127 do
        C1[i]:=2^(-p)*round(a1[i]*2^(p));
        aa2:=a2[i] + (a1[i]-C1[i])* 2^7;
        C2[i]:=2^(-q)*round(aa2 * 2^(q));
        if (C2max < abs(C2[i])) then
               C2max:=abs(C2[i]) end if;
        poly2:=minimax(
              1/(1+1/128*i+x) - C1[i]*x - C2[i]*x^2,
              x=0..1/128,[0,0],1,'err');
        C0[i]:=2^(-cc) * round( coeff(poly2,x,0)* 2^(cc));
        err:=infnorm(1/(1+1/128*i+x) - C0[i] - C1[i]*x -
              C2[i]*x^2, x=0..1/128);
        err_rounded:=infnorm(1/(1+1/128*i+x) -
              (2^(-24) * round ((C0[i] + C1[i]*x + C2[i]*x^2)*2^24)),
              x=0..1/128);
        if errmax < err then errmax:=err end if;
        if err_rounded_max < err_rounded then err_rounded_max:=err_rounded end if;
        errminimax:=infnorm(1/(1+1/128*i+x) - a0[i] - a1[i]*x -
              a2[i]*x^2, x=0..1/128);
        if errminimax_max < errminimax then errminimax_max:=errminimax end if;
        if (C0min > abs(C0[i])) then C0min:= abs(C0[i]) end if;
        if (C1min > abs(C1[i])) then C1min:= abs(C1[i]) end if;
        if (C2min > abs(C2[i])) then C2min:= abs(C2[i]) end if;
        if (C0max < abs(C0[i])) then C0max:= abs(C0[i]) end if;
        if (C1max < abs(C1[i])) then C1max:= abs(C1[i]) end if;
        if (C2max < abs(C2[i])) then C2max:= abs(C2[i]) end if;
        FinalC0[i]:= C0[i] * 2^cc;
        FinalC1[i]:= C1[i] * 2^p;
        FinalC2[i]:= C2[i] * 2^q;
end do;
roundedbits:=ln(err_rounded_max)/ln(2.0);
goodbits:=ln(errmax)/ln(2.0);
minimaxbits:=ln(errminimax_max)/ln(2.0);
print(roundedbits,goodbits,minimaxbits);

end
```

Fig. 5

HIGH-SPEED FUNCTION APPROXIMATION

BACKGROUND OF THE INVENTION

Function approximation at high speeds with efficient use of computational and storage resources is required in a wide range of computing environments. Generally speaking, function approximation relates to the generation of an output based on an input and a given function. In applications such as digital signal processing (DSP), computer graphics, animation, virtual reality, neural networks, computer games, and others, function approximations are frequently performed and may be central to the operation of various systems. In many cases, function approximation must be carried out at high speeds using a limited amount of storage and processing resources. For example, accurate and fast computations of division, square root, exponentials, logarithms, trigonometric functions are capabilities important to many graphic processing units (GPUs), digital signal processors (DSPs), floating-point units (FPUs) of general-purpose processors, application specific integrated circuits (ASICs), and other computing devices.

To achieve high speed function approximation with efficient resource usage, methods based on table look-up of polynomial coefficients have become increasingly adopted. Here, the term "table" is used in a generic sense to refer to data storage implemented using software and/or hardware to allow data to be stored and later retrieved. For a particular input and a given function, an output may be generated by retrieving one or more polynomial coefficients using table look-up and performing calculations based on the input and the retrieved polynomial coefficient(s). For example, a linear approximation of an output f(X) corresponding to an input X may be performed by using a polynomial coefficient as a first term, multiplying another polynomial coefficient to the input to obtain a second term, and adding the first and second terms:

$$f(X) \approx C_0 + C_1 X$$

As another example, a quadratic approximation of an output f(X) corresponding to an input X may be performed by using a first polynomial coefficient as a first term, multiplying a second polynomial coefficient with the input to obtain a second term, and multiplying a third polynomial coefficient with a squared value of the input to obtain a third term, and adding the first, second and third terms:

$$f(X) \approx C_0 + C_1 X + C_2 X^2$$

Of course, higher order approximations may also be performed by utilizing additional polynomial coefficients and calculations. In this manner, function approximation based on table look-up of polynomial coefficients is carried out by performing calculations based on the input and retrieved polynomial coefficients. Such procedures can approximate functions that may otherwise be far more difficult to evaluate.

The accuracy of function approximations based on table look-up of polynomial coefficients can be significantly impacted by the limited precision of the polynomial coefficients retrieved from look-up table(s). Typically, polynomial coefficients for a particular function are first calculated at a higher precision. To calculate the polynomials at the higher precision, various methods may be used. Just as an example, an iterative method that estimates a minimax solution, which minimizes the maximum error between the approximation and the original function, employing the Remez exchange algorithm, may be employed. Such an iterative estimation may be performed using commercially available computational software such as the computer algebra system Maple. Once the polynomial coefficients have been calculated at the higher precision, they may be rounded or truncated to a lower precision representation for storage in the look-up table(s).

There are compelling reasons for limiting the precision of the stored polynomial coefficients. Increasing the precision of the polynomial coefficients not only increases the size of the look-up tables, but also adds to the complexity of calculations based on the coefficients, which can translate to further increases in semiconductor area as well as reduced execution speed. Thus, the coefficients retrieved from the look-up table(s) and used for calculations leading to the function approximation are typically designed to have limited precision. At the same time, such limits on the precision of the polynomial coefficients can account for a considerable portion of the error in outcome of these function approximations. Thus, the design of function approximation systems based on table look-up of polynomial coefficients is made especially challenging given the need for reduced semiconductor area and execution speed, on one hand, and accurate function approximation results, on the other.

Generally speaking, the difficulties associated with use of limited-precision polynomial coefficients, such as those mentioned above, can be greatly ameliorated if the accuracy of function approximations can be improved in spite of the use of limited-precision polynomial coefficients. Some methods aimed at this objective have been proposed. However, these methods can either lead to numerical problems during the execution of iterative approximation of coefficient values or otherwise fail to produce useful limited-precision coefficients. What is needed is an effective technique for performing function approximation based on table look-up of limited-precision polynomial coefficients that improves the accuracy of the function approximation.

BRIEF SUMMARY OF THE INVENTION

The present invention relates to methods and apparatuses for determining coefficients for a polynomial-based approximation of a function, by iteratively estimating a first coefficient, reducing the first coefficient to a lower precision to obtain a first limited-precision coefficient, analytically calculating a second coefficient by taking into account the first limited-precision coefficient, reducing the second coefficient to a lower precision to obtain a second limited-precision coefficient, iteratively estimating a third coefficient by taking into account at least one of the first limited-precision coefficient and the second limited-precision coefficient, and reducing the third coefficient to a lower precision to obtain a third limited-precision coefficient.

In one embodiment of the invention, the polynomial-based approximation relates to a minimax approximation of the function approximated, and at least one of the steps for iteratively estimating the first coefficient and iteratively estimating the third coefficient involves use of a Remez exchange algorithm. The function approximation may be based on a degree-two polynomial having a form of $C_0 + C_1 X + C_2 X^2$.

In accordance with a preferred embodiment of the invention, the first limited-precision coefficient, the second limited-precision coefficient, and the third limited-precision coefficient correspond to a first-order term, a second-order term, and a zero-order term, respectively, of the polynomial-based approximation. Further, the step of iteratively estimating the first coefficient may involve a degree-two minimax polynomial approximation. The step of analytically calculating the second coefficient may involve a degree-one minimax polynomial approximation that takes into account the first limited-precision coefficient. The step of iteratively estimating the third coefficient may involve a degree-zero minimax polynomial approximation that takes into account the first limited-precision coefficient and the second limited-precision coefficient. For each of a plurality of input ranges for the function, a first limited-precision coefficient, a second limited-precision coefficient, and a third limited-precision coefficient may thus be determined and stored in a storage medium.

Function approximation may be performed by receiving an input, calculating an output based on the input to approximate a function by performing calculations involving the input and a plurality of limited-precision coefficients previously determined. The first, second, and third limited-precision coefficients may be retrieved from a storage medium prior to the calculating step. In one embodiment, the input may be represented using n bits, n being a positive integer, wherein the limited-precision coefficients are retrieved from at least one addressable location in the storage medium based m bits of the input, m being a positive integer less than n.

BRIEF DESCRIPTION OF THE DRAWINGS

FIG. 5 shows computational software instructions for implementing the detailed steps for determining limited-precision coefficients depicted in FIG. 4.

DETAILED DESCRIPTION OF THE INVENTION

Figure 1:
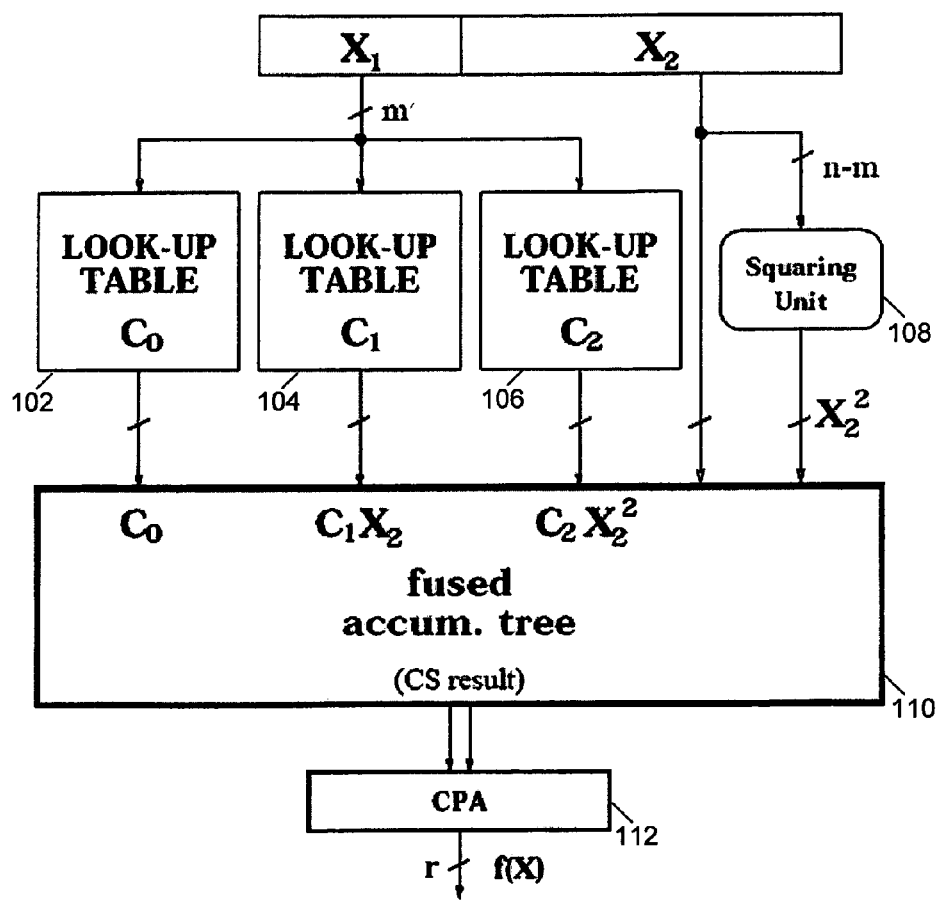
FIG. 1 is a block diagram of a function approximation unit based on table look-up of polynomial coefficients in accordance with one embodiment of the present invention.

FIG. 1 is a block diagram of a function approximation unit 100 based on table look-up of polynomial coefficients in accordance with one embodiment of the present invention. The function approximation unit 100 comprises look-up tables 102, 104, and 106, a squaring unit 108, an accumulation tree 110, and a carry-propagate adder (CPA) 112. The function approximation unit 100 receives in input X and approximates a function f(X) based on a polynomial approximation using the input X and limited-precision coefficients retrieved from look-up tables 102, 104, and 106. As shown in FIG. 1, X is an n-bit binary input that may represent a fixed-point or floating number, or a portion of such a number. In the present embodiment, X represents the significand of a floating point number comprising a significand and an exponent. For example, this floating point number may be represented using an IEEE single-precision floating point number format. According to the present embodiment of the invention, X is divided into an upper part $X_1$ that is m bits wide and a lower part $X_2$ that is n-m bits wide:

$$X_1 = [.x_1 x_2 \ldots x_m]$$

$$X_2 = [.x_{m+1} \ldots x_n] \cdot 2^{-m}$$

Here, $X_1$ is used to address the look-up tables 102, 104, and 106 to retrieve the appropriate coefficients for the function approximation. That is, the values of $C_0$, $C_1$, and $C_2$ for each function f(X) depends only on the most significant m bits of X. $X_1$ is used in this manner so that the same coefficients are retrieved for different values of X within a tolerable range. This avoids the storage of a different set of coefficients for every value of X, which can unnecessarily burdensome. $X_2$ is used, along with the retrieved coefficients, to generate polynomial approximation terms such as $C_1 X_2$ and $C_2 X_2^2$. Thus, approximation of f(X) in the range of $X_1 \leq X \leq X_1 + 2-m$ is performed by evaluating:

$$f(X) \approx C_0 + C_1 X_2 + C_2 X_2^2$$

Note that the function approximation performed utilizes calculations based on values of $X_2$ instead of X. This is possible by appropriate selection of the coefficients $C_0$, $C_1$, and $C_2$. As shown in FIG. 1, $X_1$ is used to address look-up tables 102, 104, and 106 in order to retrieve limited-precision coefficients $C_0$, $C_1$, and $C_2$. These coefficients are limited in precision in the sense that they are each represented using a limited number of bits. While three separate look-up tables 102, 104, and 106 are illustrated for storing coefficients $C_0$, $C_1$, and $C_2$, respectively, these look-up tables do not necessarily have to be implemented using separate memory devices or separate memory spaces. Also, the present embodiment of the invention illustrates use of limited-precision coefficients $C_0$, $C_1$, and $C_2$ in approximating a function f(X) by evaluating a degree-two polynomial. However, the invention is not necessarily restricted to the specific embodiment presented here.

Referring again to FIG. 1, the limited-precision coefficients $C_0$, $C_1$, and $C_2$ retrieved from the look-up tables are provided to the accumulation tree 110. $X_2$ is also provided to the accumulation tree 110. $X_2$ is further provided to the squaring unit 108 to generate the squared value $X_2^2$, which is provided to the accumulation tree 110 as well. The accumulation tree 110 works together with the CPA 112 to perform the multiplications and additions necessary to generate an output corresponding to $C_0 + C_1 X_2 + C_2 X_2^2$. Here, the combination of the accumulation tree 110 and the CPA 112 is used to enhance the performance of the function approximation unit 100 in carrying out the required multiplications and additions. Alternatively, separate multiplier and adder units, or other implementations, may be used.

As shown in the figure, the output f(X) is an r-bit binary output that may represent a fixed-point or floating-point number, or a portion of such a number. Here r may or may not be equal to n, depending on the implementation.

Although not shown in FIG. 1, range reduction techniques may be employed in conjunction with function approximation unit 100 to carry out function approximation over wider ranges of inputs. Thus, unit 100 may be used for function approximation in an input interval [a, b) and range reduction techniques may be used for values outside this input interval. Range reduction techniques are known to those of ordinary skill in the art and are therefore not discussed in further detail here.

Figure 2:
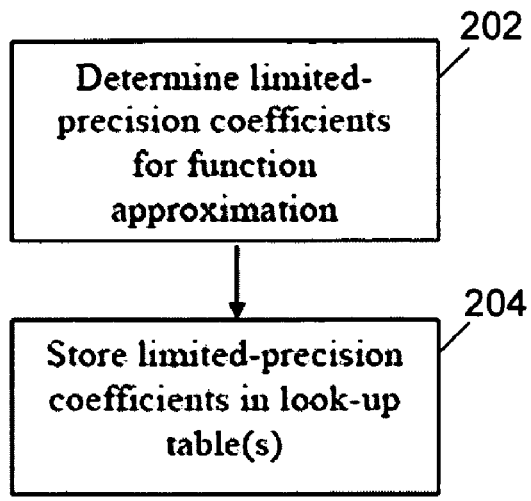
FIG. 2 illustrates basic steps for determining and storing limited-precision coefficients in look-up table(s) for function approximation in accordance with one embodiment of the present invention.

FIG. 2 illustrates basic steps involved in determining and storing limited-precision coefficients in look-up table(s) for function approximation in accordance with one embodiment of the present invention. For any given function, proper polynomial calculations performed by the function approximation unit 100 requires that the appropriate coefficients be stored in the look-up table(s), such as 102, 104, and 106. In a step 202, appropriate limited-precision coefficients are determined so that use of these coefficients in polynomial calculations may lead to the desired function approximation output. In another step 204, the limited-precision coefficients are stored in the look-up table(s) so that they can later be retrieved to perform the necessary calculations for generating the function approximation output.

Figure 3:
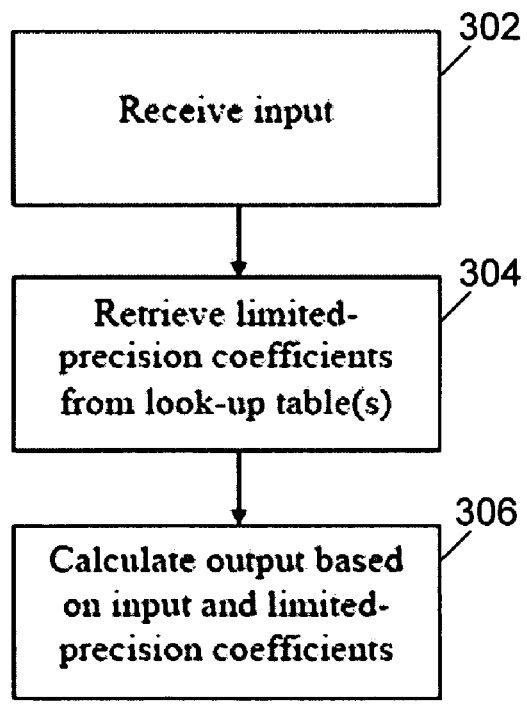
FIG. 3 illustrates basic steps for retrieving limited-precision coefficients from look-up table(s) and using the limited-precision coefficients for function approximation in accordance with one embodiment of the present invention.

FIG. 3 illustrates basic steps involved in retrieving limited-precision coefficients from look-up table(s) and using the limited-precision coefficients for function approximation in accordance with one embodiment of the present invention. In a step 302, an input X is received by the function approximation unit 100. In another step 304, the function approximation unit 100 retrieves the appropriate limited-precision coefficients from look-up table(s) for the given function, based on the input X. According to the present embodiment, unit 100 retrieves the coefficients from the look-up tables based on the $X_1$ portion of the input X. In another step 306, the function approximation unit 100 calculates the output based on the input X and the limited-precision coefficients. According the present embodiment, unit 100 performs this calculation using the retrieved limited-precision coefficients and the $X_2$ portion of the input X. The output is an approximation of the function f(X).

Figure 4:
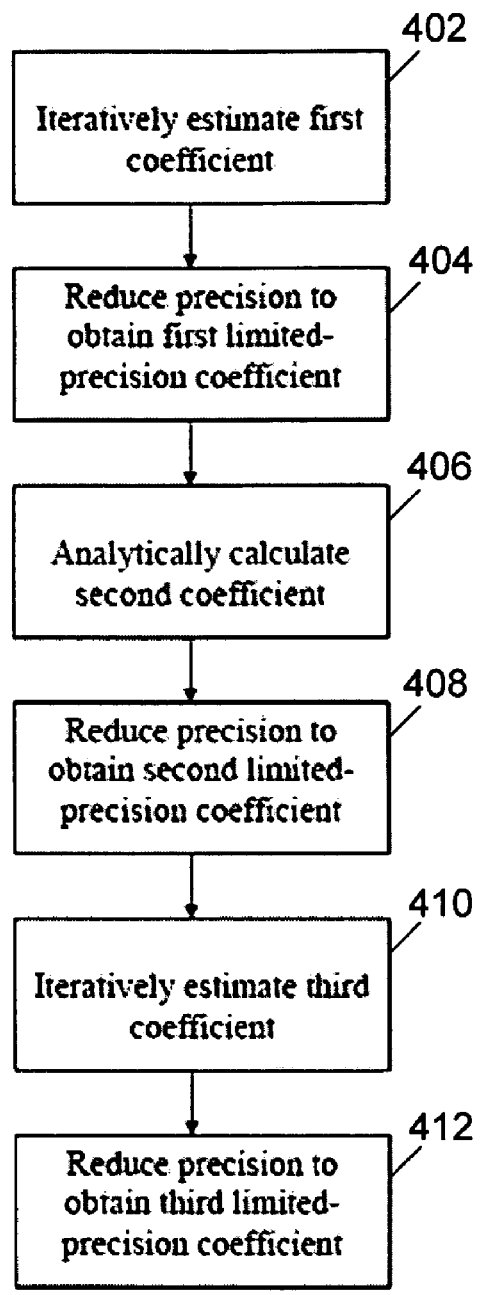
FIG. 4 illustrates more detailed steps relating to the step of determining limited-precision coefficients depicted FIG. 2.

FIG. 4 illustrates more detailed steps relating to the step for determining limited-precision coefficients depicted FIG. 2. In accordance with the present embodiment of the inventions, limited-precision coefficients $C_0$, $C_1$, and $C_2$ are to be determined in order to approximate a function f(X) by evaluating a second-degree polynomial, as previously described:

$$f(X) \approx C_0 + C_1 X_2 + C_2 X_2^2$$

If higher precision coefficients $c_0$, $c_1$, and $c_2$ can be used, the approximation would be more accurate, and the equation becomes:

$$f(X) \approx c_0 + c_1 X_2 + c_2 X_2^2$$

In a step 402, higher precision coefficients $c_0$, $c_1$, and $c_2$ are iteratively estimated. Here, iterative estimation involves repeated estimations of the coefficients that become progressively closer to the desired result, as measured by a chosen error criterion. Different error criteria may be used as the basis of the iterative estimation, such as minimax error, mean squared error, and others. Minimax error relates to minimization of the maximum error, or deviation between the approximated function and the actual function f(X), over the relevant range of the input X. Further, different iterative techniques may be used to perform the iterative estimation, such as the Remez exchange algorithm. In accordance with a preferred embodiment of the present invention, iterative estimation in this step is performed based on a minimax error measure, using the Remez exchange algorithm. Such an iterative estimation may be performed using commercially available software such as the computer algebra system Maple. The iterative estimation performed at step 402 produces higher precision coefficients $c_0$, $c_1$, and $c_2$.

In a step 404, one of the higher precision coefficients $c_0$, $c_1$, and $c_2$ is reduced in precision to produce a limited-precision coefficient. Here, the reduction in precision may be accomplished by truncation, rounding, a modified form of rounding, or some other type of reduction in the number of bits used to represent the coefficient. According to a preferred embodiment of the present invention, the first order coefficient $c_1$ is chosen as the first coefficient that is reduced in precision. Thus, according to this preferred embodiment, the higher precision coefficient $c_1$ is reduced in precision to generate a limited-precision coefficient $C_1$.

In a step 406, a new higher precision coefficient $c_2'$ is analytically calculated, taking into account the limited-precision coefficient $C_1$. The equation for f(X) illustrated previously can be rewritten as:

$$f(X) \approx c_0 + c_1 X_2 + c_2 X_2^2 = c_0' + C_1 X_2 + c_2' X_2^2$$

which can be rewritten as the following:

$$(c_1 - C_1) X_2 = (c_0' - c_0) + (c_2' - c_2) X_2^2$$

By making a substitution of $Y = X_2^2$, the equation becomes:

$$(c_1 - C_1) * \operatorname{sqrt}(Y) = (c_0' - c_0) + (c_2' - c_2) Y$$

This presents a linear, or degree-one, approximation of the function sqrt(Y). It can be shown that over the interval $[0, 2^{-2m}]$, the minimax solution to this linear approximation is:

$$2^{(-m-3)} + 2^p Y$$

where the error is $2^{(-m-3)}$. This solution can be utilized to obtain the new higher precision coefficient $c_2'$:

$$(c_2' - c_2) = (c_1 - C_1) * (2^m)$$

which yields:

$$c_2' = (c_1 - C_1) * (2^m) + c_2$$

Thus, the analytical calculation described above generates the new higher precision coefficient $c_2'$, which can be expressed in terms of known values $c_1$, $c_2$, $C_1$, and m.

In a step 408, the new higher precision coefficient $c_2'$ is reduced in precision. Again, the reduction in precision may be accomplished in different ways. The reduction in precision generates a limited-precision coefficient $C_2$.

In a step 410, a newer, higher precision coefficient $c_0''$ is iteratively estimated, taking into account the limited-precision coefficients $C_1$ and $C_2$. Here again, the iterative estimation may be based on different error criteria. Also, different iterative techniques may be used to perform the iterative estimation. In accordance with a preferred embodiment of the present invention, iterative estimation in this step is performed based on a minimax error measure, using the Remez exchange algorithm. Again, the iterative estimation may be performed using commercially available software such as the computer algebra system Maple. The iterative estimation performed at step 410 produces the higher precision coefficient $c_0''$:

$$f(x) - C_1 X_2 - C_2 X_2^2 \approx c_0 + c_1 X_2 + c_2 X_2^2 - C_1 X_2 - C_2 X_2^2$$

or $$c_0 + (c_1 - C_1) X_2 + (c_2 - C_2) X_2^2 \approx c_0''$$

Accordingly, the degree-zero minimax polynomial solution $c_0''$ is obtained as an approximation to the function $f(x) - C_1 X_2 - C_2 X_2^2$. This higher precision coefficient $c_0''$ incorporates $c_0$, the rounding/approximation error of $C_1$, and the rounding/approximation error of $C_2$.

In a step 412, the higher precision coefficient $c_0''$ is reduced in precision. Again, the reduction in precision may be accomplished in different ways. The reduction in precision generates a limited-precision coefficient $C_0$. Thus, steps 402 through 412 generate the limited-precision coefficients $C_0$, $C_1$, and $C_2$, which are all reduced in precision and may be stored in look-up table(s). $C_2$ has taken into account the rounding/approximation error corresponding to $C_1$, and $C_0$ has taken into account the rounding/approximation errors corresponding to $C_1$ and $C_2$. In this manner, improved performance may be achieved in function approximation based on finite-length coefficients. In the present embodiment of the invention, the first, second, and third coefficients described in steps 402 through 412 correspond to coefficients for the first-order, second-order, and zero-order terms, respectively, of the polynomial approximation. That is, first the coefficient for the first order term is determined, next the coefficient for the second-order term is determined, and then the coefficient for the zero-order term is determined. However, the invention is not necessarily restricted to this particular sequence of determining coefficients.

FIG. 5 shows computational software instructions for implementing the detailed steps for determining limited-precision coefficients depicted in FIG. 4. Here, the particular computational software used is the commercially available computer algebra system referred to as Maple. However, other computational software or techniques may also be used. As shown in FIG. 5, the function to be approximated is the reciprocal function, that is, $f(X)=1/X$. The width of $X_1$ is 7 bits (m=7). The interval over which approximation of this function is provided is $X=[1, 2)$. Execution of the instructions shown in FIG. 5 generates limited-precision coefficients $C_0$, $C_1$, and $C_2$ for each of a plurality of input ranges of X distributed evenly over the interval $[1, 2)$.

Although not illustrated in the figures, biased rounding may also be used in function approximation unit 100. In accordance with one embodiment of the present invention, the rounding scheme employed is a modification of rounding to the nearest, which can be combined with simulation to obtain enhanced results. This rounding scheme involves adding a function-specific rounding bias before performing the truncation or rounding of intermediate results obtained within function approximation unit 100. The function-specific bias may be determined based on the error distribution of results obtained through simulation. This allows for reduction in the error of the final result and may compensate for errors introduced by finite arithmetic operations performed within approximation unit 100.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for determining coefficients for a polynomial-based approximation of a function comprising:
   iteratively estimating a first coefficient;
   reducing the first coefficient to a lower precision to obtain a first limited-precision coefficient;
   analytically calculating a second coefficient by taking into account the first limited-precision coefficient;
   reducing the second coefficient to a lower precision to obtain a second limited-precision coefficient;
   iteratively estimating a third coefficient by taking into account at least one of the first limited-precision coefficient and the second limited-precision coefficient;
   reducing the third coefficient to a lower precision to obtain a third limited-precision coefficient; and
   storing the limited-precision coefficients in lookup tables, wherein the lookup tables enable, for a given input, lookup of limited-precision coefficients for computing an approximate output of the function using the polynomial-based approximation of the function.

2. The method of claim 1 wherein the polynomial-based approximation relates to a minimax approximation of the function.

3. The method of claim 1 wherein at least one of the steps for iteratively estimating the first coefficient and iteratively estimating the third coefficient involves use of a Remez exchange algorithm.

4. The method of claim 1 wherein the polynomial-based approximation is based on a polynomial having a form of $C_0+C_1X+C_2X^2$.

5. The method of claim 1 wherein the first limited-precision coefficient, the second limited-precision coefficient, and the third limited-precision coefficient correspond to a first-order term, a second-order term, and a zero-order term, respectively, of the polynomial-based approximation.

6. The method of claim 1 wherein the step of iteratively estimating the first coefficient involves a degree-two minimax polynomial approximation.

7. The method of claim 6 wherein the step of analytically calculating the second coefficient involves a degree-one minimax polynomial approximation that takes into account the first limited-precision coefficient.

8. The method of claim 7 wherein the step of iteratively estimating the third coefficient involves a degree-zero minimax polynomial approximation that takes into account the first limited-precision coefficient and the second limited-precision coefficient.

9. The method of claim 1 wherein said steps are performed to obtain a first limited-precision coefficient, a second limited-precision coefficient, and a third limited-precision coefficient for each of a plurality of input ranges for the function.

10. The method of claim 9 further comprising the step of storing in a storage medium the first limited-precision coefficient, second limited-precision coefficient, and third limited-precision coefficient for each of the plurality of input ranges.

11. A method for performing function approximation comprising:
    receiving an input;
    calculating an output based on the input to approximate a function by performing calculations involving the input and a plurality of limited-precision coefficients previously determined by:
    a) iteratively estimating a first coefficient;
    b) reducing the first coefficient to a lower precision to obtain a first limited-precision coefficient;
    c) analytically calculating a second coefficient by taking into account the first limited-precision coefficient;
    d) reducing the second coefficient to a lower precision to obtain a second limited-precision coefficient;
    e) iteratively estimating a third coefficient by taking into account at least one of the first limited-precision coefficient and the second limited-precision coefficient; and
    f) reducing the third coefficient to a lower precision to obtain a third limited-precision coefficient; and
    storing the limited-precision coefficients in lookup tables, wherein the lookup tables enable, for a given input, lookup of limited-precision coefficients for computing an approximate output of the function for the given input.

12. The method of claim 11 further comprising the step of retrieving the first, second, and third limited-precision coefficients from a storage medium prior to the calculating step.

13. The method of claim 12 wherein the input is represented using n bits, n being a positive integer, wherein the limited-precision coefficients are retrieved from at least one addressable location in the storage medium based m bits of the input, m being a positive integer less than n.

14. An apparatus for performing function approximation comprising:
  a computation unit for calculating an output based on an input to approximate a function by performing calculations involving the input and a plurality of limited-precision coefficients;
  a storage medium, coupled to the computation unit, for storing the limited-precision coefficients, wherein the limited-precision coefficient are determined by:
    a) iterative estimation of a first coefficient;
    b) reduction of the first coefficient to a lower precision to obtain a first limited-precision coefficient;
    c) analytical calculation of a second coefficient that takes into account the first limited-precision coefficient;
    d) reduction of the second coefficient to a lower precision to obtain a second limited-precision coefficient;
    e) iterative estimation of a third coefficient for the polynomial-based approximation that takes into account at least one of the first limited-precision coefficient and the second limited-precision coefficient; and
    f) reduction of the third coefficient to a lower precision to obtain a third limited-precision coefficient; and
  wherein the storage medium is also for storing the limited-precision coefficients in lookup tables, wherein the lookup tables enable, for a given input, lookup of limited-precision coefficients for computing an approximate output of the function for the given input.

15. The apparatus of claim 14 wherein the polynomial-based approximation relates to a minimax approximation to the function.

16. The apparatus of claim 14 wherein at least one of the iteratively estimation of the first coefficient and iterative estimation of the third coefficient involves use of a Remez exchange algorithm.

17. The apparatus of claim 14 wherein the polynomial-based approximation is based on a polynomial having a form of $C_0+C_1X+C_2X^2$.

18. The apparatus of claim 14 wherein the first limited-precision coefficient, the second limited-precision coefficient, and the third limited-precision coefficient correspond to a first-order term, a second-order term, and a zero-order term, respectively, of the polynomial-based approximation.

19. The apparatus of claim 14 wherein iterative estimation of the first coefficient involves a degree-two minimax polynomial approximation.

20. The apparatus of claim 19 wherein analytical calculation of the second coefficient involves a degree-one minimax polynomial approximation that takes into account the first limited-precision coefficient.

21. The apparatus of claim 20 wherein iterative estimation of the third coefficient involves a degree-zero minimax polynomial approximation that takes into account the first limited-precision coefficient and the second limited-precision coefficient.

22. The apparatus of claim 14 wherein the storage medium stores a first limited-precision coefficient, a second limited-precision coefficient, and a third limited-precision coefficient for each of a plurality of input value ranges for the function.

* * * * *